FIG. 1

James R. Cox
Haines C. Hibbard INVENTORS

BY
John D. Gassett ATTORNEY

James R. Cox
Haines C. Hibbard INVENTORS

United States Patent Office 3,315,223
Patented Apr. 18, 1967

3,315,223
DIGITAL SEISMIC RECORDING
Haines C. Hibbard, Houston, and James R. Cox, Richardson, Tex., assignors, by mesne assignments, to Esso Production Research Company, Houston, Tex., a corporation of Delaware
Continuation of application Ser. No. 99,808, Mar. 31, 1961. This application June 10, 1966, Ser. No. 557,862
14 Claims. (Cl. 340—15.5)

This is a continuation of application Ser. No. 99,808, filed Mar. 31, 1961, now abandoned, entitled "Digital Seismic Recording," by Haines C. Hibbard and James R. Cox.

This invention relates generally to a system for recording seismic signals. It relates especially to a system wherein a seismic signal is converted into a digital form in which it is recorded.

In a general method of seismic exploration a seismic disturbance such as an explosion of dynamite is generated at or near the surface of the earth. Seismic waves are thus transmitted through the earth and are detected at various locations by seismic transducers commonly called geophones. This signal detected is relatively strong at first and then weakens with time. To compensate for this most systems employ an AVC (automatic volume control) system whereby the decaying effect of the signal is compensated. This most usually takes the form of an amplifier connected to the geophone and an attenuator connected to the output of the amplifier which at first attenuates the signal considerably and then gradually diminishes the attenuation. The signal is then recorded in any number of ways such as with pulse-width modulation and then is recorded on magnetic tape or the like or recorded as a wiggly trace record. These signals thus recorded are quite useful in the exploration for oil and gas; however, the signal thus recorded is deficient in that, for example, the signal is not as accurate as is required for certain advanced seismic computations for interpretation. It is also necessary to determine "first kick," i.e., the exact time the first reflection is received at the geophone from energy from the seismic disturbance such as the dynamite explosion.

One object therefore of this invention is to provide an improved system whereby the accuracy of the signal recorded is improved.

Also an object of this invention is to provide an improved seismic recording system in which the signal is recorded in digital form.

It is another object of this invention to change the amplification of the input seismic signal by fixed steps in which the fixed steps are increased by a factor which is a schedule of powers of two, whereby such amplification gains are readily compatible with binary recording and computation.

Briefly in a preferred embodiment one aspect of this invention includes a system for recording in digital form a plurality of seismic signals received from a plurality of geophones. A plurality of amplifying means with one for each geophone is used. Each of such amplifying means includes means to increase the gain by fixed steps by schedule of powers of two. A selector switch is connected to the output of each of the amplifier means and the switch sequentially connects the output of each amplifier means to a sample-and-hold circuit whose output is fed to an analog-to-digital converter. Recording means are connected to the output of the digital converter for recording the output of the converter, i.e., the binary data numbers, and also to record the gain of each geophone amplifier corresponding to the time of the output of the converter. The signal from each geophone is thus recorded in digital form in which the amount of amplification is also indicated.

Further objects and a better understanding of this invention can be had from the following description taken in conjunction wtih the drawing in which.

Figure 1:
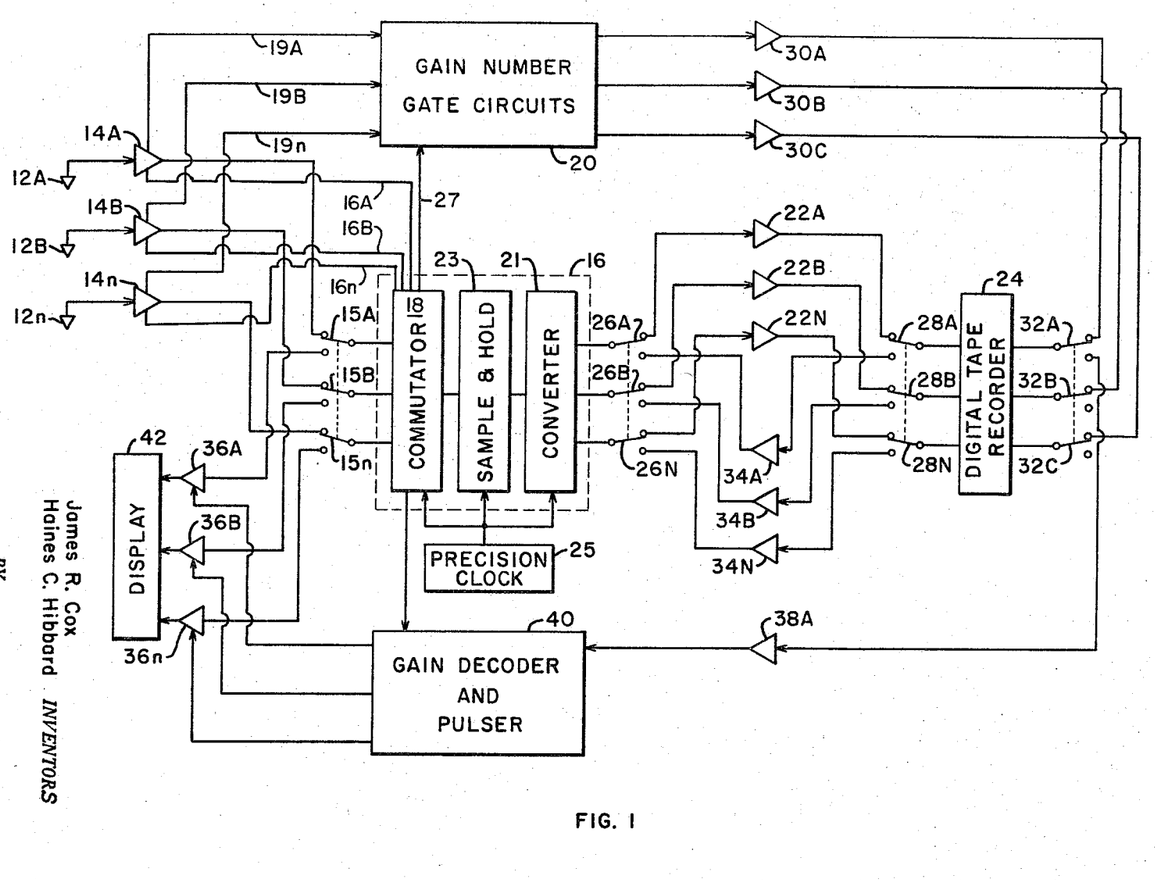
FIG. 1 illustrates in block diagram form the preferred embodiment of the recording system of the invention.

FIG. 1 illustrates the best mode contemplated for carrying out the invention and is a block diagram of a field recording system and including a monitoring system. Illustrated thereon are geophone locations 12A through 12n. Each geophone 12A can be a single geophone or can represent an array of geophones in any desired fashion to detect a seismic signal in a known manner for example. The output of geophones of 12A through 12n are fed to amplifier means 14A to 14n respectively which include means to increase the gain ot the signal fed to it by fixed steps in which each step represents a gain in amplification by a schedule of powers of two. This then is readily compatible with binary recording as all that is necessary to obtain a correct digital number is to move the binary point in accordance with the amplification factor. A specific embodiment of an amplifier capable of performing this step-wise gain is illustrated hereinafter in connection with FIG. 2. The amplified output signal of geophones 14A through 14n are fed electrically through two-way switches 15A through 15n respectively to an analog-to-digital converter means 16.

Amplifier means 14A through 14n are electrically connected to gain number gate circuits 20 by multiple conduits 19A through 19n respectively. These conduits convey a signal to gain number gate circuits 20 containing information as to which step gain its respective amplifier is in.

Analog-to-digital converter means 16 includes a commutator or electronic switch 18 to which the output of switches 15A through 15n are fed and sequentially connected to sample-and-hold circuit 23. The output of the sample-and-hold circuit 23 is fed to analog-to-digital converter 21. A precision clock 25 is electrically connected to commutator 18, sample-and-hold circuit 23, and converter 21 and commands these circuits. For example, it commands commutator 18 to switch from one geophone channel to the next, it commands sample-and-hold circuit 23 to resample the signal fed thereto from commutator 18, and it commands converter 21 to convert to a digital value the analog signal fed to it from sample-and-hold circuit 23. Commutator 18 can be, for example, purchased commercially, one suitable switching means being manufactured by Packard Bell Computer Corporation, 1905 Armacost Avenue, Los Angeles 25, Calif., and is identified as their electronic multiplexer—EC1 which is a high speed, solid state scanning switch. A suitable converter 21 is commercially available, for example, from Packard Bell Computer Corporation, supra, identified as their multiverter M2 which is a high speed voltage-to-digital and digital-to-voltage conversion system. Lines 16A, 16B, and 16n respectively connect commutator 18 to amplifier 14A, 14B, and 14n for the purpose of individually transmitting a gain determination command signal to the inddividual amplifiers immediately after the signal from the amplifier in question has been sampled by sample-and-hold circuit 23, as described in greater detail with respect to FIG. 2. A multiple channel conduit 27 connects commutator 18 to gain number gate circuit 20. This signals the gate as to which geophone the input signal to be passed is from. The gain number passed through gain number gate circuit 20 corresponds to the gain of the geophone channel whose signal is connected through commutator 18.

The output of converter 21 is electrically connected through ganged switches 26A through 26N to digital record amplifiers 22A, 22B and 22N. Switches 26A through 26N are similar to 15A through 15n and are merely two-position switches. The record amplifiers 22A through 22N are connected through two-position switches 28A to 28N respectively to digital tape recorder 24.

The output of gain number gate circuit 20 is fed through amplifiers 30A, 30B and 30C and two-position switches 32A, 32B and 32C to digital tape recorder 24. Any number of amplifiers and switches can be used. However, three provides for the coding of eight stages of amplification. Drive amplifiers or record amplifiers 30A, 30B and 30C are similar to record amplifiers 22A through 22N. When the digital value for the analog signal of geophone 12A is recorded on digital tape recorder 24, also recorded thereon from gain number gate circuit 20 is a code which has the information as to what stage of gain amplifier 14A is in at the time that the signal from geophone 12A was sampled and converted to a digital value. A suitable digital recorder is commercially available from Potter Instrument Company Plainfield, N.J. and is designated their Model 906 Digital Tape Recorder.

Figure 2:
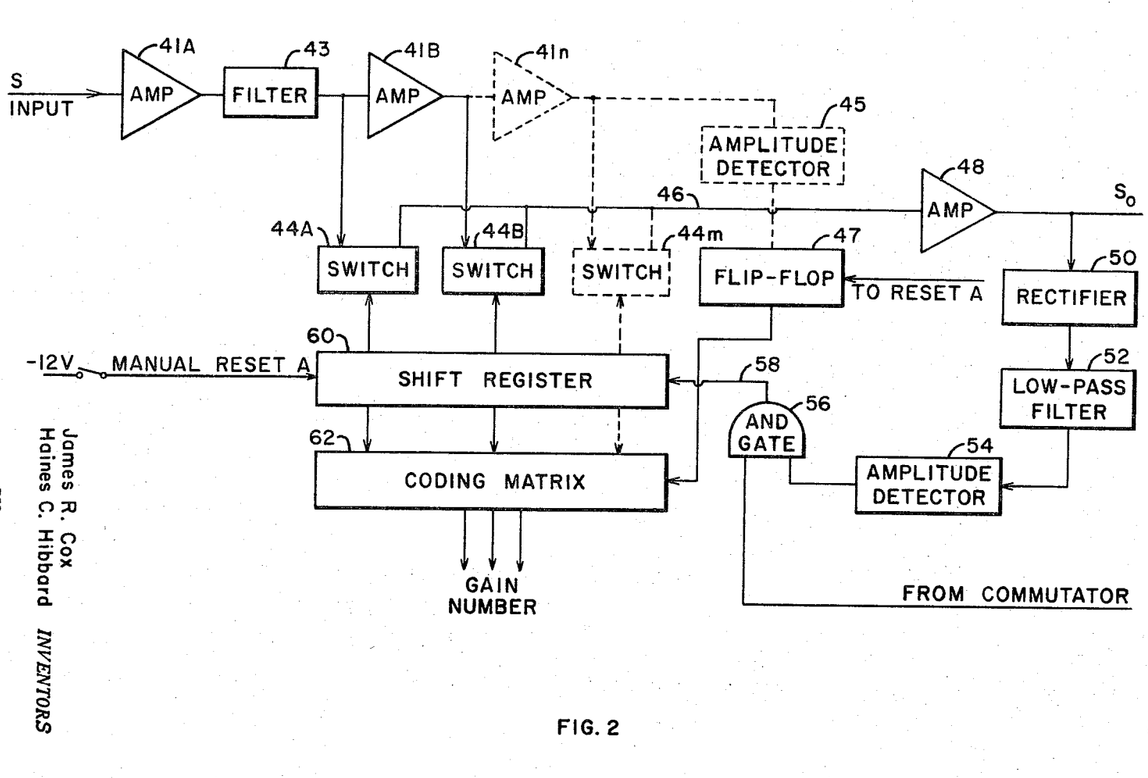
FIG. 2 illustrates in detail the amplifier input element of FIG. 1.

Turning now to FIG. 2, there is illustrated in detail the element indicated as amplifiers 14A in FIG. 1. Illustrated thereon are a plurality of cascaded amplifier stages 41A to 41n. The input of amplifier 41A is the signal received from geophone location 12A. Interposed between amplifier stages 41A and 41B is a filter 43. Filter 43 is any type filter which is of a character to reject all frequencies except those in the band of interest which is normally in the range from about 2 to 200 cycles per second for use in geophysical prospecting in using the system disclosed therein. In addition to being fed to the next succeeding cascaded amplifier stages, the output of each such stage is fed to switches 44A through 44m respectively. The output of switches 44A through 44m are fed to a common conductor line 46 which connects to the input of output amplifier stage 48.

The output of output amplifier stage 48 is fed to commutator 18. The output is also fed to rectifier 50 whose output is connected to a low-pass filter 52. The output of low-pass filter 52 is the general envelope of the output of output amplifier stage 48. The time constant of low-pass filter 52 should be such as to obtain a general trend of the signal. The output of low-pass filter 52 is electrically connected to and fed to amplitude detector 54. Amplitude detector 54 can be any of a number of devices capable of detecting a signal level, for example, a Schmitt trigger circuit. The output of amplitude detector 54 changes states of the amplifier, for example, it pulses the shift register to increase the voltage output of amplifier 14A when the input from the low-pass filter 52 falls to some predetermined level. The output of amplitude detector 54 is fed to "and" gate 56. The "and" gate 56 is such as to have an output signal in conductor 58 only when the "and" gate receives a signal from amplitude detector 54 and at the same time receives a signal from commutator 18. The signal from the commutator to the "and" gate 56 permits an increase gain step only immediately after the signal from amplifier stage 48 has been sampled by the commutator 18. This permits a maximum settling time between increase of gain and the next sampling of the signal. The output of "and" gate 56 is fed to shift register 60. Shift register 60 controls the on and off conditions of switches 44A through 44m. In the initial condition switch 44A is on and the remaining switches are off. When a shift pulse is received from the "and" gate, switch 44A is turned off and 44B is turned on. In a similar manner succeeding pulses sequentially turn off and on the switches in order.

Shift register 60 is coupled to coding matrix 62. The coding matrix converts signals from the shift register into a binary number which indicates the particular switch 44A through 44m which is in its "on" condition. The coding matrix greatly reduces the number of lines which is necessary to describe the condition of the shift register 60. For example, if there are seven switches, that is if M equals 7, this could be coded into a three bit binary number. The output of coding matrix 62 is connected to gain number gate circuit 20.

The "first kick" is sensed and indicated by the amplitude detector 45 and flip flop 47. Before recording, the shift register is set to an initial gain step zero, one or two and an artificial code number 7 is induced by the flipflop 47 connection to the coding matrix. When the high gain stage of the amplifier senses a signal, the flipflop 47 changes state removing the artificial code 7 letting it revert to the actual gain number in use either zero, one or two. This action does not affect the actual gain setting or its control as described previously above to permit proper recording of the first strong part of the seismic signal.

Figure 2A:
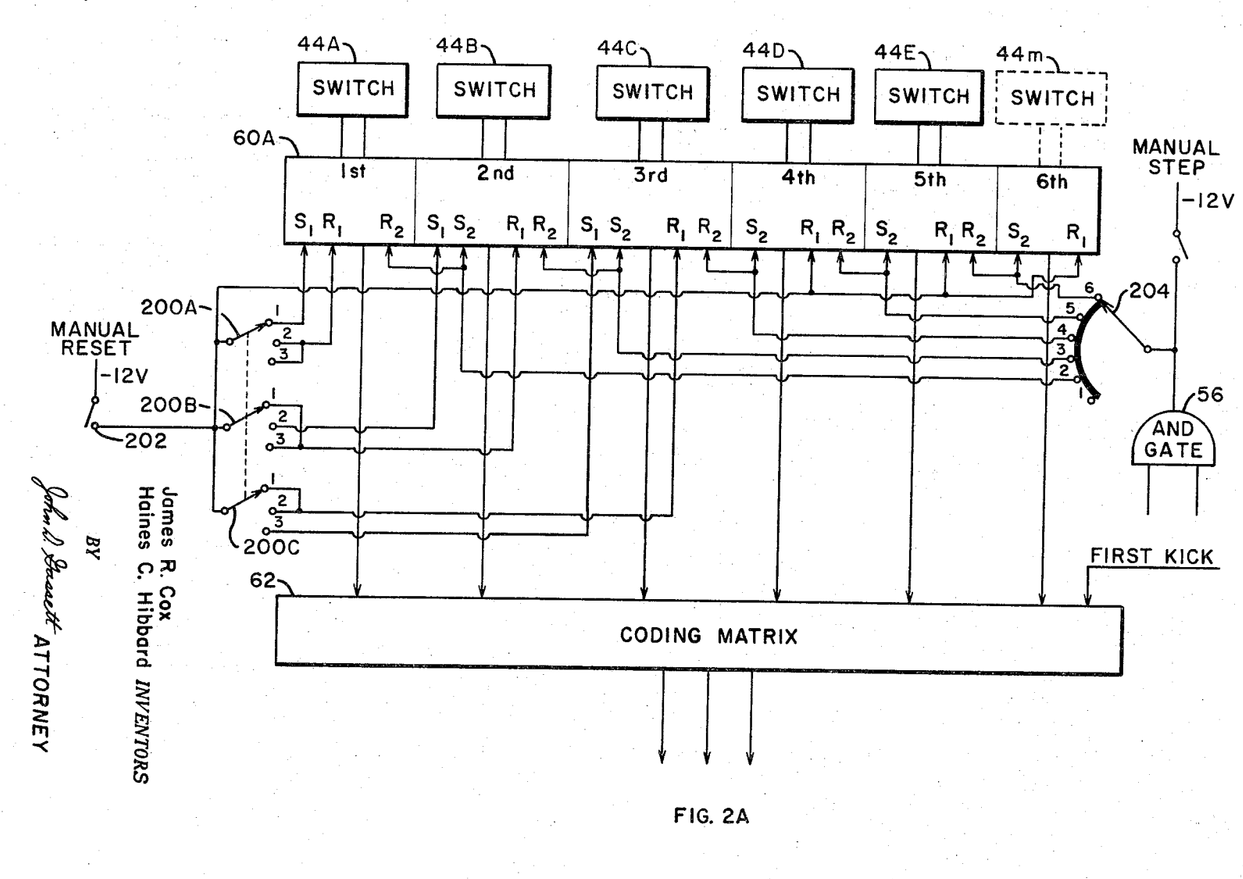
FIG. 2A and FIG. 2B illustrate in greater detail certain features of one embodiment of the amplifier means of FIG. 2.
Figure 2B:
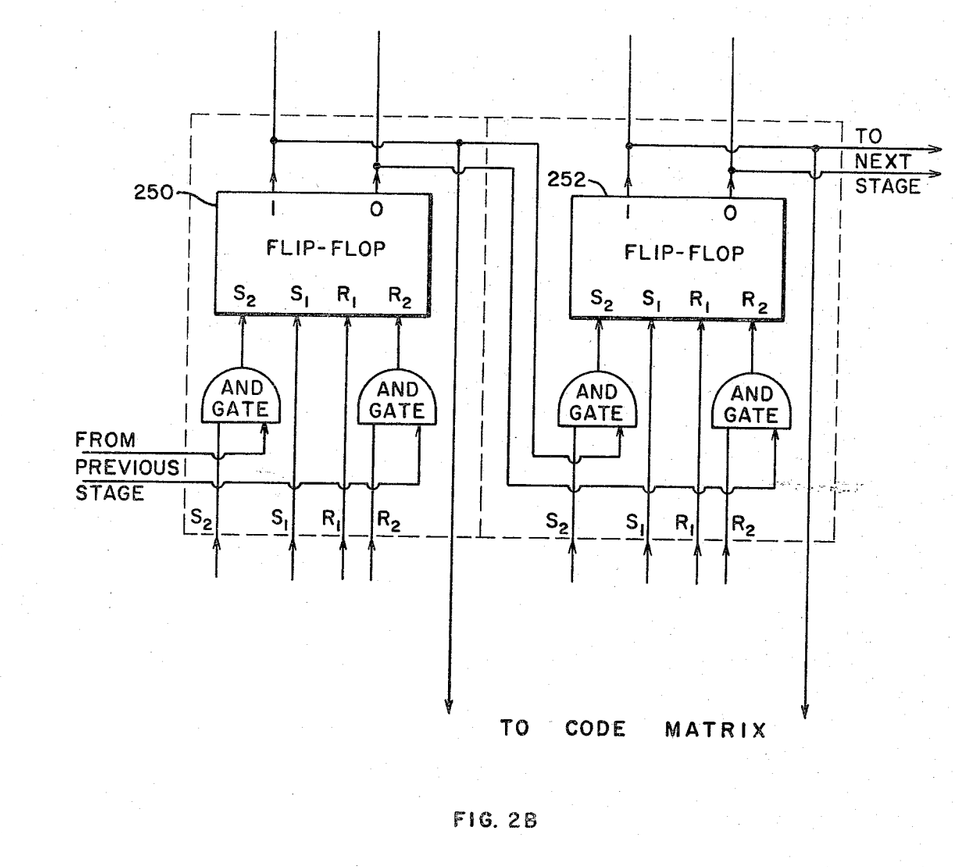

It is sometimes desirable to commence amplification of the seismic input signal at some stage other than the first. It is also sometimes desirable to limit the amplification, i.e., stop the step-wise gain at some stage. To obtain this, the shift register of FIG. 2 is modified as illustrated in FIG. 2A and FIG. 2B. Accordingly, shift register 60A has been modified to provide means such that the initial gain can be set in any of the first three positions and the final gain can be set in any of the positions with results in no shifts or a definite number of gains. It will also be understood that modifications can be such that the initial stage can be any stage as desired. The shift register 60A, as shown, has six stages but of course can be any number.

Means for manually setting the first or initial stage of the shift register prior to recording will now be discussed. Each stage of the shift register is of course a means for controlling an individual electronic gate, such as switch 44A through 44m, to control the overall gain of the amplifier of FIG. 2. There are proivded three switches 200A, 200B and 200C, each of which has positions 1, 2 and 3. These three switches are ganged such that they are all in the same corresponding position; that is, when one switch is in position 1, the others are also in position 1. Shift register 60A can be a standard shift register of many stages with six stages being shown in the drawing. Each such stage contains standard set and reset inputs as indicated by $S_1$ and $R_1$ in the drawing. It also has $S_2$ and $R_2$ which are inputs that set or reset the stage of the shift register during the shifting operation. These are described more fully in connection with FIG. 2B.

Each such flipflop stage has two set and two reset inputs. These inputs are "and" gated with the preceding stage to produce the shift action. The end stages and the three not having normal set have fewer inputs. These set and reset inputs are combined to take three external commands—two from the switches 200A (B or C) and 204 and prior shift gate. One set of switches forms the control state before recording. A combination of the set and reset inputs produces the shift under command of switch 204 which terminates shifting at a designated stage. A reset line is provided for normal reset and a normal shift button is provided for test purposes. It is recognized that the set-reset connections represent internal wiring of individual flipflops under the term shift register and are indicated externally only to clarify the control pattern.

The initial gain of the amplifier is set by positioning pulsing switches 200A, 200B and 200C in one of their three positions with results in the first three stages of the shift register being set on or off in accordance with the setting of the switches. When the ganged switches are in position 1, the first stage of the shift register is set and all other stages are reset. This results in the first electronic switch 44A (which is controlled by the first stage of shift register 60A) being on and all other electronic switches 44B through 44m being off. When the ganged switches are in position 2, the second stage of the shift register is set and switch 44B is activated and the other switches are off. A similar condition holds true when these switches are in their number 3 position. Switches 200A, 200B and 200C are manually operated. A reset pulse source is connected to these switches. Prior to recording, a reset pulse is applied to contact 202 which is in communication with switches 200A, 200B and 200C. The reset pulse is also in communication with the other reset inputs of the other stages of the shift register.

Means for limiting the amplification gain to a particular level will now be discussed. The output of "and" gate 56, which is a shift pulse, is connected to shift pulse control switch 204. This switch is a shorting type which starting from $R_2$ of stage one sequentially and accumulatively contacts the shift inputs of the succeeding shift stages from one through six as shown or $n$. The result is that shifting can be stopped at any stage which controls the final gain of the amplifier at the end of recording. In other words, this limits the maximum gain which is used during recording.

Attention is now directed to FIG. 2B which illustrates two adjacent stages of the shift register 60 of FIG. 2. Illustrated thereon are two flipflops 250 and 252. Each of these flipflops have two set inputs designated by $S_1$ and $S_2$, and two reset inputs designated by $R_1$ and $R_2$. The two set inputs are isolated from each other in a conventional manner within the flipflop. Likewise, the two reset inputs are isolated from each other within the flipflop in a known manner. Each flipflop also has a true and false output indicated by 1 and 0 respectively. The output from the 1 and the 0 output of flipflop stage is fed to one of the electronic switches 44A for example; these outputs also go to the "and" gates of the next succeeding stage or flipflop which will now be identified. The symbols $S_2$, $S_1$, $R_1$ and $R_2$, shown in FIG. 2A correspond to those symbols used in FIG. 2B in the shift register. If the shift impulse is connected to all the $S_2$ and $R_2$ as shown in FIG. 2A, then shift register 60 will function as an ordinary shift register. In this arrangement the switches turn on successively as each succeeding shift pulse is encountered up to a certain switch as determined by the setting of shift pulse control switch 204. When the last shift register stage chosen by the switch 204 becomes operative, it remains operative even though succeeding shift pulses are received. For example, if it is desired that there be no shifting beyond the fourth stage of the register, switch 204 is set on position 4. Assuming that switch 200A, B, and C are all set in one position, and stage 1 is on and all others off, then upon receiving the first shift pulse from "and" gate 56, the switch driven by shift register stage 2 is turned on and the other switches turned off. Upon receiving the second pulse the switch driven by stage 3 is turned on and the other turned off. Upon receiving the fourth shift pulse the switch operated by the fourth stage of the shift register is turned on and the others turned off. Upon receiving additional shift pulses, the shift register does not shift but leaves shift register stage 4 on maintaining switch 44D on. This occurs because no shift pulse is received by reset $R_2$ of stage 4 nor are any pulses received by either stage 5 or 6.

Figure 7:
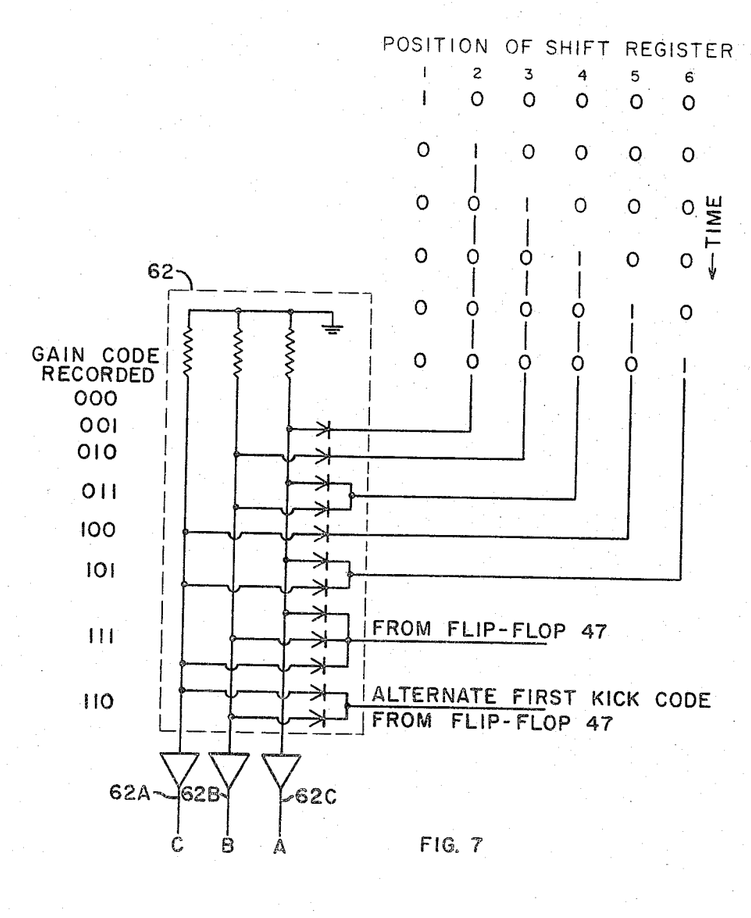
FIG. 7 illustrates the gain code for different gains of the amplifier shown in FIG. 2.

Turning now to FIG. 7, there is illustrated the gain code in manner and form for each position of the shift register. As stated above, the shift register shown is illustrated as having six stages, however this can vary, but for the purposes of this description it is assumed that it has six. Shown in FIG. 7 is the position of the shift registers with the numeral 1 indicating the successive stages of the shift register states with regard to successive shift pulse times. Matrix 62 is indicated thereon as being enclosed by a dotted line. To the left of the matrix is the gain code recorded in binary form to indicate the successive positions of the shift register. To the right of the matrix 62 are lines which indicate which of the stages of the shift registers control these specific number coding elements of the matrix. The three lines leading out of the bottom and illustrated thereon as 62A, 62B and 62C are illustrated in FIG. 1 as line 19A for example.

Note that the control line marked first kick goes back to first kick sensing flipflop 47 in the amplifier diagram. It acts once as the first energy is renewed then does not respond to further pulses. An alternate connection of a coding arrangement for the first kick is indicated in FIG. 7.

Figure 3:
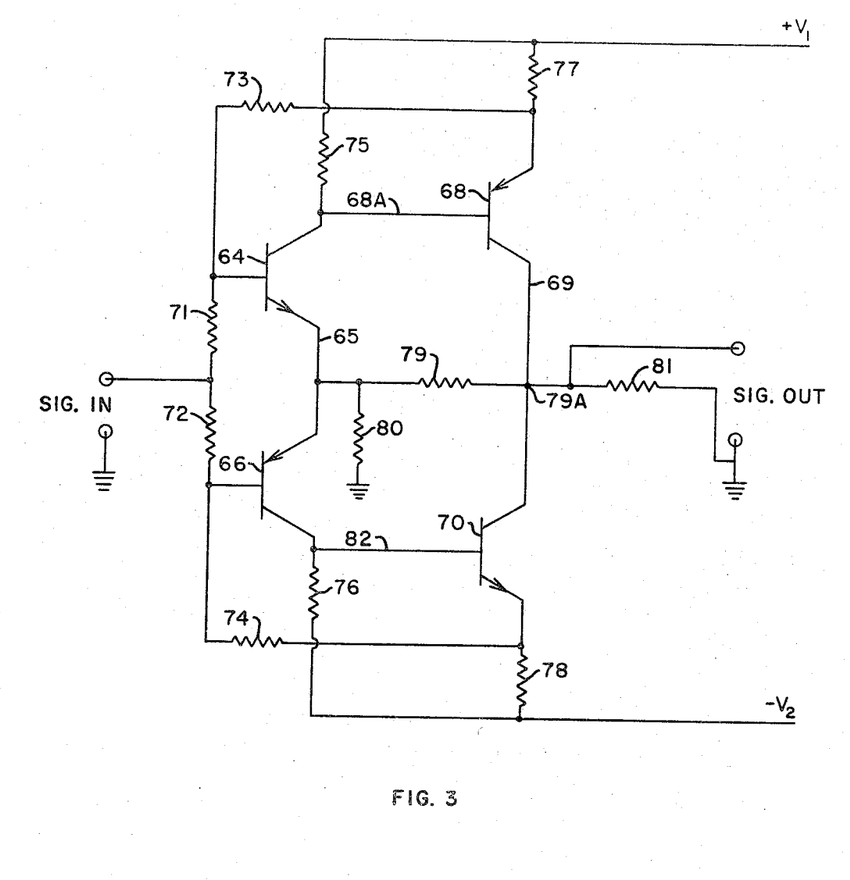
FIG. 3 illustrates a preferred circuit for one of the amplifier stages illustrated in FIG. 2.

A novel circuit making up one of the amplifier stages such as 41A of FIG. 2 is illustrated in FIG. 3. It is a non-inverting amplifier composed of two complementary transistor stages. The first stage includes transistors 64 and 66. The second stage includes transistors 68 and 70. As can be seen its basic configuration is a bridge. Transistors 64 and 70 are NPN and transistors 66 and 68 are PNP type. The emitters of transistors 64 and 66 are connected by conductor 65. The collectors of transistors 68 and 70 are electrically connected together by conductor 69.

The bias network is composed of resistors 77, 73, 71, 72, 74 and 78. Transistor 64 receives its bias from the junction of resistor 73 and 71. Transistor 66 is biased at the junction of resistors 72 and 74.

A positive voltage source with respect to ground is electrically connected to the emitter of transistor 68 through resistor 77 and to the collector of transistor 64 through resistor 75. An equal negative voltage source with respect to ground is connected to the emitter of transistor 70 through resistance 78 and to the collector of transistor 66 through resistor 76. The collector side of transistor 66 is connected through conductor 82 to the base of transistor 70. In the upper half of the circuit the collector of transistor 64 is electrically connected through conductor 68A to the base of transistor 68. Conductors 65 and 69 are connected through resistor 79 at junction 79A. Conductor 65 is also connected to the reference ground through resistor 80. Junction 79A is connected to ground through resistor 81.

It is thus seen then that the configuration in FIG. 3 is a non-inverting amplifier composed of two complementary transistor stages. The circuit is so arranged that the class of circulating currents inside can vary with temperature and become quite high without displacing either the input reference voltage which is to ground, or the output voltage which is also referenced as zero with respect to the ground. One advantage of this then is that coupling condensers operating with these transistor stages have no voltage drop across them when the amplifier has no input or output signal. The two sides of the amplifier are symmetrical in that the bias divider for the first stage (includes transistors 64 and 66) is composed of six resistors. Opposite pairs of these resistors such a 71 and 72, 73 and 74, and 77 and 78 are of equal value. The collector load resistors of transistors 64 and 66 (in the first stage) are load resistors 75 and 76 of equal value.

The emitter resistors 77 and 78 in the output stage are also of equal value. The result of this is that the circulating currents drawn by transistors 64 and 66 or transistors 68 and 70 do not shift the signal reference which is zero with respect to ground if the transistors are reasonably well matched and in the same temperature environment.

The amplifier incorporates three feed-back sources. The first feed-back source (resistors 71 and 73 for transistor 64 and resistors 72 and 74 for transistor 66) stabilizes the bias network to the input stage and is referenced back to the emitter of the output stage in its respective upper or lower half of the amplifier. Thus if one of the transistors begins to draw too much current due to temperature effect, the bias stabilization operates to reduce this effect. In the second feed-back means degeneration is introduced into all the transistors in the first stage by resistor 80 and in the second stage by resistors 77 and 78. The third feed-back means sets the overall amplifier gain and is comprised of resistors 79 and 80 which return a fraction of the output voltage from junction 79A returning it to the common emitter line 65 of the first stage.

When a seismic signal is first detected, it is relatively large but the amplitude level decays with time. Therefore, amplifying means are needed which has a small gain when the signal is large but a large gain for the smallest usable part of the signal. The minimum gain is determined by the maximum signal which can be processed or handled by the system as it leaves the amplifier. The output of each amplifier stage must also stay within a given operating range. Given an amplifier stage such as 41A with a gain of A, a maximum output of L, an equivalent input noise N, the noise output for any given signal will now be determined. For example, output $S_o$ of output amplifier stage 48 in FIG. 2. In the example shown the minimum gain then is $A^2$. This is determined by the largest relationship $A^2Sl = L$ where $Sl$ = the largest allowed signal at the input. Then for any other signal where the optimum gain is $A^{(k)}$ the output signal and noise are:

$$S_o = A^{(k)} \times S$$
$$N_o = N(A + A^2 = \ldots A^{(k)})$$

Figure 5:
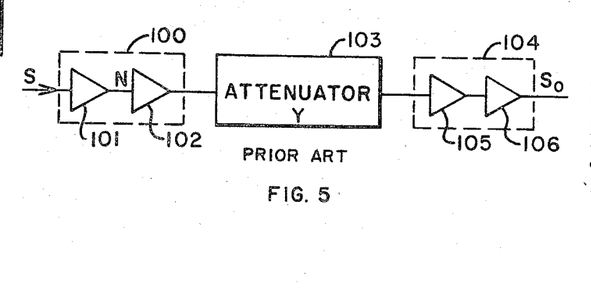
FIG. 5 illustrates a conventional or known means for compensating for the decay of the seismic signal with respect to time.

This value of noise given above for the amplifying system shown in FIG. 2 will now be compared to the noise of a conventional controlled gain amplifier such as illustrated schematically in FIG. 5 for the same input signal.

Illustrated in FIG. 5 is amplifier 100 having two stages 101 and 102. The input signal S is fed thereto and the output signal from amplifier 100 is fed to the controlled attenuator 103. Attenuator 103 is any one of a number of electronic devices used for automatic volume control or a variable voltage divider or the like. The output of attenuator 103 is fed to another amplifier 104 which can conveniently be made of various stages such as amplifier stage 105 and 106. The output from amplifier 104 is $S_o$. For the purpose of this illustration it is desired that for a given input signal S in either FIG. 2 or FIG. 5 that at any given point the gain is the same. The amplifying factor of amplifier 100 is limited by the largest signal $Sl$ occurring at the end of it. This limitation is caused by the fact that the amplified signal appearing at the output of amplifier stage 102 must not exceed the maximum allowable output L. For this example, the gain of amplifier 100 is limited to $A^2$ or two stages corresponding to the initial gain shown for the system in FIG. 2. The maximum number of amplifier stages is $n+1$ as in the amplifier shown in FIG. 2. This means that there will be two stages preceding attenuator 103 and $n-1$ stages following attenuator 103.

For the same arbitrary signal S as used in the determination of $N_o$ above the desired gain is again $A^{(k)}$. Therefore, attenuation Y is determined by the relationship $$\frac{A^{(n+1)}}{Y} = A^{(k)} \text{ or } Y = \frac{A^{(n+1)}}{A^{(k)}} = A^{(n+1-k)}$$

The corresponding noise out of the amplifier of FIG. 5 is $$N_o' = N\left(A + A^2 + \ldots A^{(n-1)} + \frac{A^{(n)}}{Y} + \frac{A^{(n+1)}}{Y}\right)$$
$$= N(A + A^2 + \ldots A^{(n-1)} + A^{(k-1)} + A^{(k)})$$

Comparing this expression to the expression for $N_o$ above for the system of FIG. 2, it is obvious that the noise $N_o'$ out of the system shown in FIG. 5 is greater for all values of gain except that when $k$ is equal to $n+1$, that is when no attenuation is in the system. Therefore, a system such as that shown in FIG. 2 will handle the same signals with less noise. This clearly shows the value of this concept of amplifying the seismic signal by stepwise gain rather than by attenuation used in automatic volume control units for example. For a numerical illustration if N is equal to 5 and K is equal to 3

$$N_o = N(A + A^2 + A^3)$$
$$N_o' = N(A + A^2 + A^3 + A^4 + A^2 + A^3)$$

From the illustration above it is clear that the number of stages preceding attenuator 103, FIG. 5, is equal to the number of stages required for the initial gain. The total number of stages in FIG. 5 is determined by the desired final gain of the amplifier. The advantage of the system in FIG. 2 over that in FIG. 5 becomes increasingly marked as the ratio of the final gain to the initial gain increases, as illustrated by the equation for $N_o'$. Since all amplifiers are made up of appropriate stages with individual smaller gains, identical stages were considered for purposes of illustration. However, the relationships would still hold if these stages were not identical.

Sometime in field operations exploration the operator desires to know how his system is operating. One way is to have a visual display of such operations. A suitable monitoring system will now be discussed. This system is primarily to inform the operator if the device is functioning properly and does not attempt to use the high accuracy of the data recorded. The precision data will be utilized in high accuracy computers. The device in FIG. 1 shows means whereby field monitoring can be accomplished. After the signals received from geophone locations 12A through 12n have been recorded in digital form on digital tape recorder 24, switches 15A through 15n, switches 28A through 28N, switches 26A to 26N and switches 32A to 32C are placed in number 2 position or just opposite to that shown in the drawing. The system is then energized and the digital tape recorder is played back. The binary word representing the signal is fed back through switches 28A through 28N through amplifiers 34A through 34N. The amplifiers 34A through 34N take the signal from the tape recorder of playback 24 and convert such signals to pulses. The pulses from amplifiers 34A through 34N are fed to converter 16 which now is used as a digital to analog converter. The converted analog signal is distributed by commutator switch 18 to the proper playback amplifiers through 36A to 36n respectively in which 36A can, for convenience, represent the signal from amplifier 12A, amplifier 36B the signal from the geophone 12B and 36n from geophone 12n.

At the same instant that the digital information is being played back from digital tape recorder 24, the code showing how many stages of amplification operated on the signal is passed through switch 32A, through amplifier 38A which is similar to amplifiers 34A through 34N, to gain decoder and pulser 40. Gain decoder and pulser 40 receives a signal from commutator 18 indicating which channel is being fed an analog signal, that is which amplifier 36A through 36n. Gain decoder and pulser 40 pulse the appropriate amplifier 36A through 36n when the gain number for that particular channel changes. The amplifier means thus pulsed effects the proper amplification in the analog signal. The analog signals of amplifiers 36A through 36n are then displayed on display means 42 which can conveniently be an oscillographic camera so that the operator can readily see a monitored result of his recording.

Figure 6:
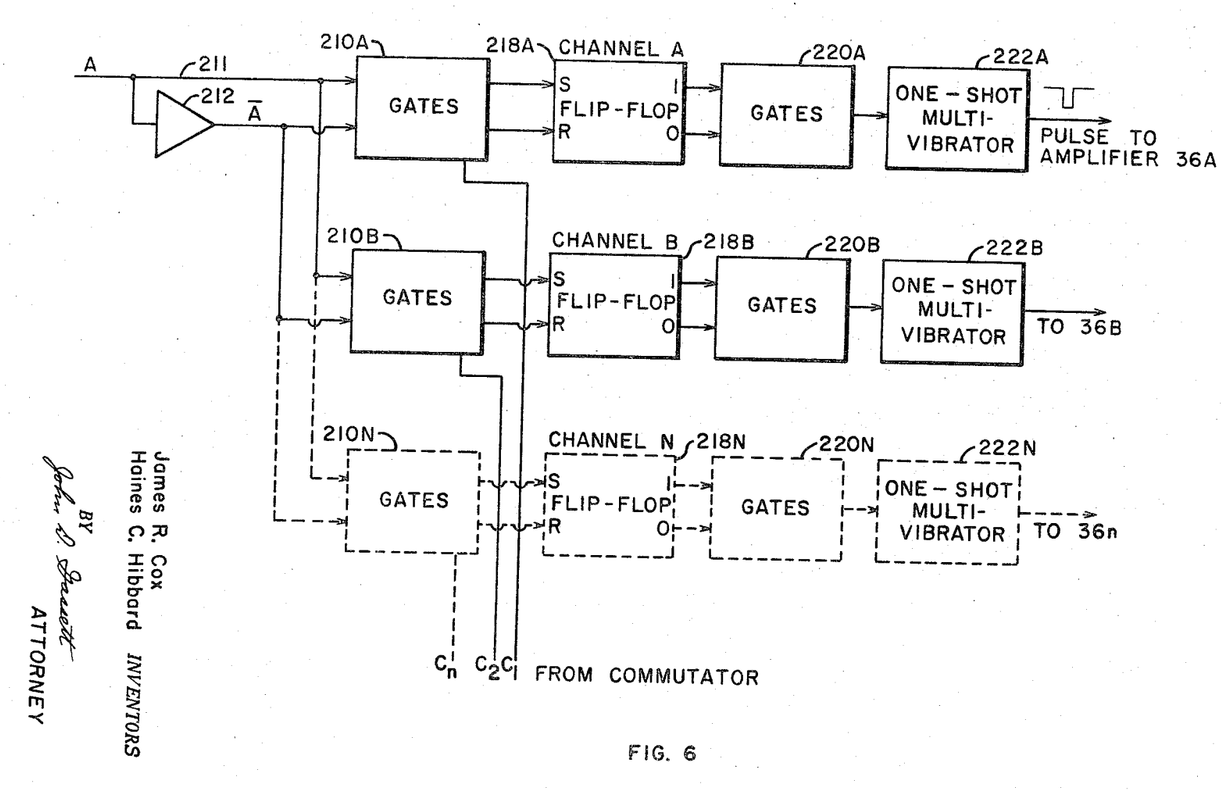
FIG. 6 illustrates in block diagram form details of the gain decoder of FIG. 1.
Figure 8:
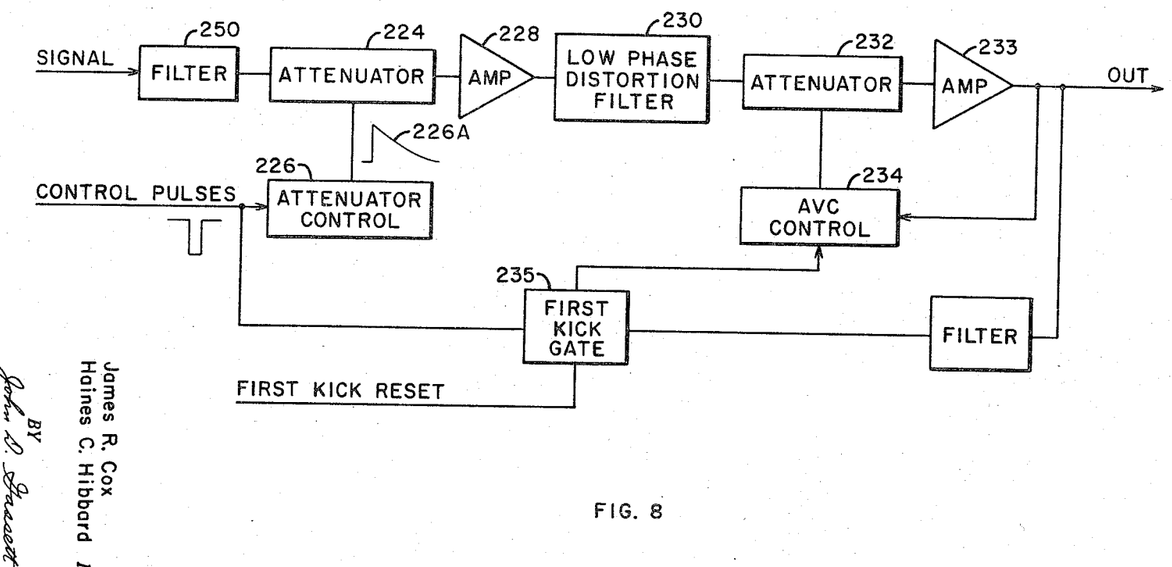
FIG. 8 illustrates means for driving the display ot FIG. 1.

Turning now to FIG. 6, there is illustrated in block diagram form in greater detail the gain decoder and pulser 40 of FIG. 1. The input code line at the upper left hand corner of the figure labeled A corresponds to the output of read amplifier 38A of FIG. 1. Line A is divided into two parts. One part 211 goes to gate 210A through 210N in its natural form and one part is inverted by inverter 212. The output of inverter 212 is also fed to each of the gates 210A to 210N. There is a gate for each of the channels of information recorded, that is there is one channel for each geophone location. Each gate is provided with a channel or lead line from the commutator 18 which closes the gate or activates the gate when information concerning that particular channel is being converted by the converter. The gate 210A performs the function described by the equation $S_1 = AC_1$ ($S_N = AC_n$ is the general equation) thus set flipflop 218A requires A, which is the first gain code line signal, plus a gate on indication signal from channel 1 of the commutator. When these two conditions occur simultaneously, flipflop 218A is set. There are provided flipflops 218A through 218N, one being for each channel. The second equation describing the function of a part of gate 210A provides for a resetting of flipflop 218A as described by the equation $R_1 = \overline{A}C_1$. In other words, reset occurs when the not A condition occurs with commutator channel 1 on indicator signal. It is understood that all of these are clocked; however, as clocks are common to most such functions, they are not shown on all operations herein. The A.-C. "or" gate 220A following flipflop 218 provides a drive pulse to the one-shot multivibrator 222A for any transition of 218A. The output of one-shot multivibrator 222A is fed to the attenuator control 226 of FIG. 8. FIG. 8 is a detailed diagram of a suitable amplifier 36A shown in FIG. 1. While the above description was specifically directed toward channel A of FIG. 6 and is the control channel for amplifier 36A, the other channels of the figure are identical and function in the same manner. The individual channels are selected by the sequencing action of the commutator.

FIG. 8 explains in detail the amplifiers identified as 36A to 36n in FIG. 1. The purpose of this amplifier (36A) is to aid in the rapid reproduction of a field monitor record and is not necessarily intended to have extremely high accuracy for computation purposes. During playback, the digital numbers are converted to an analog signal. Typically one commutator gate (a particular channel) is fed to an integrating filter 250 which converts the commutated pulse amplitude signals representing the digital numbers back to an analog signal. This analog signal is fed to an automatically resetting attenuator. The output from filter 250 is fed to an attenuator 224 with the characteristic shown in curve 226A which is an exponential curve. Control pulses are fed to attenuator control 226 from the gain decoder and pulser 40. The control pulses correspond to the gain shifts times in the original recording at which time the gain was increased by pre-set power such as the amount of the gain in the stages in amplifiers 14A through 14n. During playback then when one of these pulses arise, it is indicative of a gain increase in the playback voltage. It is here used by the attenuation control 226 to give out a voltage which controls the attenuation of attenuator 224. In the case shown the shape of this control shown in curve 226A is an abrupt increase in attenuation followed by an exponential decay of attenuation back to the preset attenuation. The output of attenuator 224 is fed to amplifier 228 and low-phase distortion filter 230. The low-phase distortion filter is a conventional seismic filter. The output of this filter is fed to attenuator 232 which is part of an AVC loop. The AVC (automatic volume control) loop comprises the attenuator 232, amplifier 233, and the sensitive control circuit 234, which are conventional. Prior to the use of the amplifier, first kick gate or flipflop 235 is reset. The first gain change pulse that arrives changes the state of this flipflop to its final state. This accomplishes two things: (1) it puts a first kick indicator pulse on the record produced and (2) activates the AVC control circuit which has been held in a pre-set state. After the AVC control 234 has been activated, it is free to follow the signal, that is it is automatic.

After the amplifier has conditioned itself as described above, the record coming from the tape continues to pass through the amplifier while the recording camera is running. Successive control pulses arriving from gain decoder 40 indicate when the playback gain needs to be changed. During playback these pulses will continue to reset the attenuator smoothing the incoming signal. At the end of the record, the tape player and the display camera will be stopped automatically by automatic control means such as photoelectric cells on the tape deck and the like which are not shown.

Figure 4A:
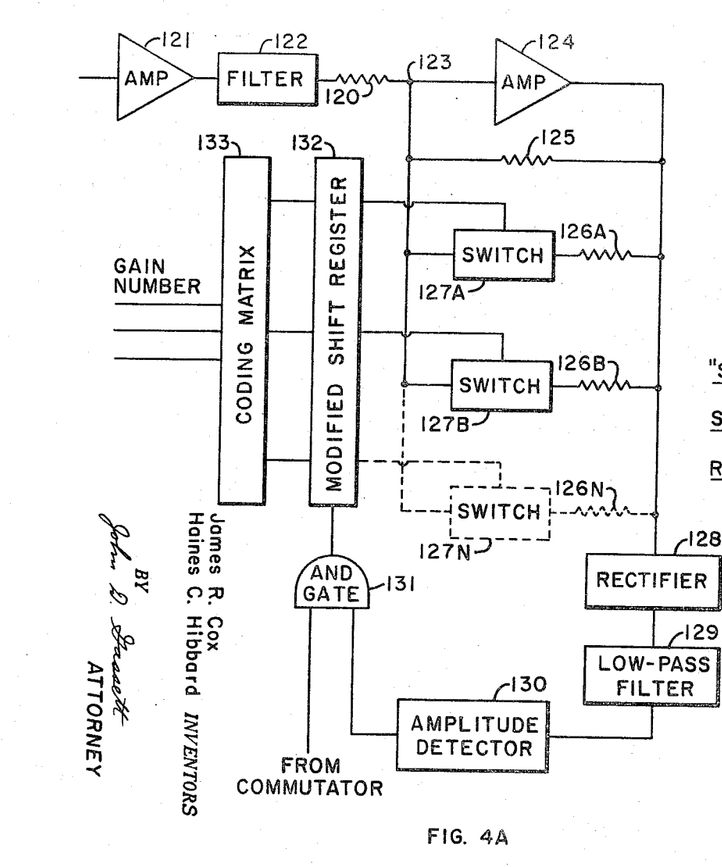
FIG. 4A illustrates another step-wise gain amplifier and FIG. 4B illustrates one form of a modified shift register of FIG. 4A.
Figure 4B:
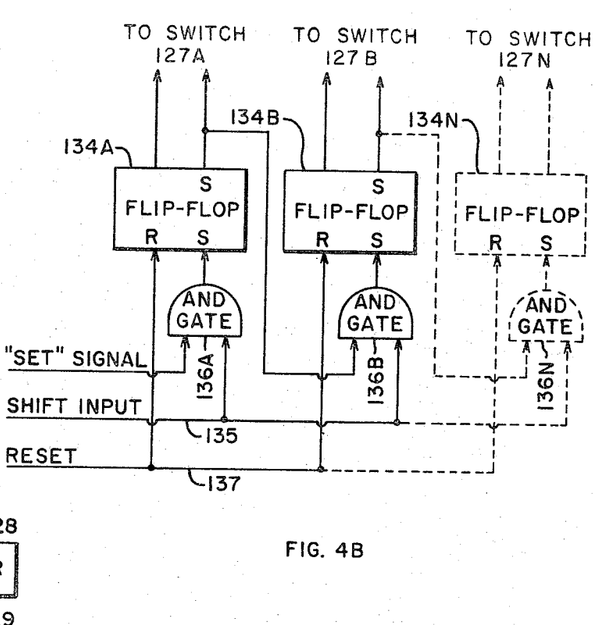

Turning now to FIGS. 4A and 4B, there is illustrated another amplifier which can be used as amplifier 14A in FIG. 1, for example. An input signal, such as from geophone 12A, is fed to amplifier 121 and filter 122 which are similar to amplifier 41A and filter 43 shown in and described above in connection with FIG. 2. The output of filter 122 is fed through input resistance 120 to summing junction 123. Connected to the summing junction 123 is a high-gain amplifier 124 whose characteristics are such that the overall gain is determined by the ratio of the feed-back resistance to the input resistance. The feed-back resistance consists of a combination of resistors 125 and 126A, 126B, and 126N. The input resistance is resistor 120. The gain of the amplifier shown in FIG. 4A can be changed in steps by closing or opening switches 127A through 127N. The gain is changed by turning one of the switches off which, in effect, removes its corresponding resistance from the circuit. With all the switches 127A through 127N closed, the gain is proportional to the parallel combination of all feed-back resistors 125 and 126A through 126N. For the first gain change, switch 127A is opened removing resistor 126A from the circuit. The new gain then is a parallel combination of all feed-back resistors except 126A. It is possible to choose the value of these resistors such that the ratio of the gain with the switch opened to the ratio of the gain with the switch closed is any desired value. For the next successive gain step, switch 127B is open removing resistor 126B from the circuit. Switch 127A also remains open. Then the gain is a parallel combination of all feed-back resistors except resistor 126A and 126B. By changing feed-back resistance in this manner there is less transient effect than if one resistance was removed and another added. Additional gain steps are made by removing additional feed-back resistance by opening the associated switches in a manner as described above.

Attention will now be directed toward that part of the components of FIG. 4A which opens the switches, and the manner and time the switches are open. The manner of determining when a gain should be made and pulsing the shift register in FIG. 4A is similar to the system in FIG. 2. This includes rectifier 128, low-pass filter 129, amplitude detector 130 and "and" gate 131 of FIG. 4A which are similar to rectifier 50, low-pass filter 52, amplitude detector 54 and "and" gate 56 of FIG. 2. In FIG. 2 only one switch 44A through 44m is on at a time and the switches are turned on in sequence. In FIG. 4A when the operation begins, all the switches 127A through 127N are on and they are turned off one at a time with each switch remaining off once it is turned off for that series of operations. Again, matrix 133 can be used to indicate the gain stage of the amplifier circuit in a manner similar to that used in matrix 62 of FIG. 2.

Attention will now be directed to FIG. 4B which illustrates in detail the modified shift register 132 of FIG.

4A. Shown in FIG. 4B are a plurality of flipflop circuits 134A through 134N. These flipflops control the switches 127A through 127N such that when flipflop is in its reset condition, the switch is on. The shift from "and" gate 131 is fed through conductor 135 to "and" gates 136A, 136B and 136N. Also fed to "and" gate 136A is a set control signal. When "and" gate 136A receives simultaneously a signal from the shift input "and" gate 131 and from the set signal source, flipflop 134A is set turning off switch 127A. This also applies a signal to "and" gate 136B and the next time that a pulse comes from "and" gate 131, flipflop 134B is set and switch 127B is open. This process continues until flipflop 134N is set, or until the signal has been processed. To reset the flipflop, a reset pulse is fed through conductor 137 to each of the flipflops. This is done some time prior to the recording of any signal.

It was shown above that the amplifier of FIG. 2 had better signal to noise ratio, for a particular signal, than the device of FIG. 5 which uses an attenuator.

It can also be shown by mathematical analysis that the amplifier of FIGS. 4A and 4B likewise has better signal to noise performance.

While there are above disclosed but a limited number of embodiments of the system of this invention herein presented, it is possible to produce still other embodiments without departing from the inventive concept herein disclosed. It is therefore desired that only such limitations be imposed on the appended claims as are stated therein.

What is claimed is:

1. A system for recording a plurality of seismic signals which comprises:
   a plurality of variable gain means for changing the amplitudes of said seismic signals, the gain of each of said variable gain means being variable by steps wherein the individual steps represent changes in gain which differ from the next greater or lower gain by a factor of $2^n$, where $n$ is a whole number;
   analog-to-digital converter means to convert an analog electrical signal to a first digital signal;
   multiplexer means connected to said plurality of variable gain means for transmitting the output signals from said each variable gain means to said analog-to-digital converter means according to a predetermined sequence;
   means connected to said each variable gain means responsive to the amplitude of the seismic signal therefrom to vary the gain of said each variable gain means in a preselected manner, only immediately after transmission from said each variable gain means to said analog-to-digital recording means;
   means to generate a second digital signal indicative of the gain of said each variable gain means; and
   digital recording means to record each said first digital signal and its corresponding said second digital signal in synchronism.

2. A system for recording a plurality of seismic signals in digital form which comprises:
   a plurality of variable gain means for changing the amplitude of each said seismic signal, the gain of each of said variable gain means being variable for each seismic signal by steps wherein the gain of each step differs from the gain of an adjacent step by a factor of $2^n$ where $n$ is a whole number;
   analog-to-digital converter means to convert analog electrical signals to digital signals;
   multiplexer means connected to said plurality of variable gain means and said analog-to-digital converter means to transmit the output seismic signals from said each variable gain means to said analog-to-digital converter means at time-spaced intervals whereby each seismic signal may be converted into digital form;
   means connected to said each variable gain means responsive to the amplitude of the seismic signal therefrom to vary the gain of said each variable gain means in a preselected manner, only immediately after transmissions from said each variable gain means to said analog-to-digital recording means;
   signal generating means to generate digital signals which are indicative of the gain of the variable gain means, the output signal of which is being transmitted by said multiplexer means to said analog-to-digital converter means; and
   digital recording means to record each digitized seismic signal from said analog-to-digital converter means along with the corresponding digital signals from said signal generating means on a reproducible record medium in a preselected relation.

3. A system for recording a plurality of seismic signals from geophones in digital form which comprises:
   a plurality of variable gain means for electrical connection to the geophones, the gain of said variable gain means being variable by fixed steps wherein each step represents a change in gain of two to a given power;
   first means connected to said variable gain means for cyclically and sequentially sampling the output signals of said variable gain means to produce an output signal;
   second means connected to each said variable gain means for producing an output signal functionally related to the amplitude of the output signal of said each variable gain means;
   third means connected to the output of said second means and to said each variable gain means for varying the gain of said each variable gain means between samplings of the output signals of said each variable gain means by said first means when the output signal of said second means is of a given amplitude;
   analog-to-digital converter means electrically connected to the output of said first means to convert said output signal of said first means to a first digital signal;
   fourth means for generating a second digital signal indicative of the gain of each of said variable gain means; and
   digital recording means electrically connected to the output of said converter means and to said fourth means to record said first digital signal and said second digital signal in synchronism.

4. The system of claim 3 wherein said first means includes a sample-and-hold means, commutator means for sequentially connecting analog input signals to said sample-and-hold means, and wherein said second means is connected to said commutator means to produce a pulse immediately after connection of the signal from said variable gain means to said sample and hold means.

5. The system of claim 4 wherein said second means includes full-wave rectifier means electrically coupled to the output of said variable gain means, and low pass filter means electrically connected to the output of said full-wave rectifier means, and wherein said third means includes trigger circuit means for producing an output pulse when the output signal from said filter means is of a predetermined magnitude; and further including AND circuit means connected to said first means and said trigger circuit means for producing an output signal upon reception of a signal from said trigger circuit means concomitantly with connection of the output of said variable gain means to said sample and hold means by said commutator means.

6. A system for recording a seismic signal from a geophone in digital form which comprises:
   variable gain means for electrical connection to the geophone, the gain of said variable gain means being variable by fixed steps wherein each step represents a change in gain by two to a given power;
   multiplexing means connected to said variable gain means for multiplexing a plurality of input signals on a time-sharing basis, said input signals including the output signal of said variable gain means;

first means connected to said variable gain means for producing an output signal functionally related to the amplitude of the output signal of said variable gain means;

second means connected to the output of said first means and to said variable gain means for varying the gain of said variable gain means between instants at which the output signal of said variable gain means is multiplexed with other input signals to said multiplexing means, and when the output signal of said second means is of a given amplitude;

analog-to-digital converter means electrically connected to the output of said multiplexing means to convert the output signal of said multiplexing means to a first digital signal;

fourth means for generating a second digital signal indicative of the gain of said variable gain means; and digital recording means electrically connected to the output of said converter means and to said fourth means to record said first digital signal and said second digital signal in synchronism.

7. An amplifier for stepwise gain of an input signal which comprises in combination:

a cascade of amplifier stages with the output of the first stage being connected to the input of the next succeeding stage;

an output amplifier stage;

a plurality of switches;

conducting means connecting the output of each amplifier stage with the input of said output amplifier stage;

a switch in each conducting means, each said switch having an on and off position and capable of being switched by an electrical signal;

a rectifier electrically connected to the output of said output amplifier stage;

a low-pass filter electrically connected to the output of said rectifier;

an amplitude detector electrically connected to the output of said filter and of a character to emit a signal upon the output of said filter reaching a predetermined level; and a shift register electrically connected to the output of said amplitude detector, said shift register being electrically connected to each of said switches and being of a further character to render one of said switches conductive in a sequential manner upon receiving a signal from said amplitude detector.

8. A system for recording in digital form a seismic signal received from a geophone which comprises in combination:

a cascade of amplifier stages including a first stage and a last stage with the output of the first stage being connected to the input of the next succeeding stage;

an output amplifier stage;

a plurality of switches;

conducting means connecting the output of each amplifier stage with the input of said output amplifier stage;

a switch in each conducting means, each said switch having an off and on position and capable of being switched by an electrical pulse;

a rectifier electrically connected to the output of said output amplifier stage;

a low-pass filter electrically connected to the output of said rectifier;

an amplitude detector electrically connected to the output of said filter and of a character to emit a signal upon the output of said filter reaching a predetermined level;

a shift register having a plurality of stages electrically connected to the output of said amplitude detector, a stage of said shift register being electrically connected to each of said switches such that said shift register renders said switches individually and singularly conductive in a sequential manner upon receiving a signal from said amplitude detector;

an analog-to-digital converter means electrically connected to the output of the output amplifier stage;

digital recording means electrically connected to the output of said converter; and means to record on said digital recording means an indication of which switch is on each time information is recorded on said recording means 9. An apparatus as defined in claim 8 in which said shift register has means provided to start the shift register on a preselected stage.

10. An apparatus as defined in claim 8 including means to stop said shift register on a preselected stage.

11. An apparatus as defined in claim 8 in which means are provided to both start said shift register is a preselected stage and to stop said shift register in a second preselected stage.

12. A system for recording in digital form a plurality of seismic signals received from a plurality of geophones including monitoring means to monitor the digital recording which comprises in combination:

a plurality of amplifying means with one such means connectable to each of said geophones;

an analog-to-digital converter, said converter being capable of being reversed to convert digital information to analog information;

a sample-and-hold circuit means electrically connected to the input of said converter;

a selector switch means whose output is electrically connected to the input of said sample-and-hold circuit, the output of each of said amplifying means being electrically connected independently to the input of said selector switch means with said switching means being of a character to sequentially connect each amplifying means with said sample-and-hold circuit;

each of said amplifying means including means connected to said selector switch means for varying the gain of said each amplifying means in a preselected manner by fixed steps in accordance with a schedule of powers of two, only immediately after connection of said each amplifying means to said sample-and-hold circuit means;

a digital recording means electrically connected to the output of said converter;

means to record on said recorder the gain of each geophone each time such geophone is connected to said sample-and-hold circuit;

said digital recording means including means to reproduce the signal stored thereon;

means to connect the reproduced output from the reproducing means of the digital recording means with said converter such that said converter is in its digital-to-analog conversion stage;

display amplifier means electrically connectable to said converter such as to amplify the analog signal;

gain decoder means electrically connected to the output of the digital recording means and of a character to signal said display amplifiers as to the amount of amplifications; and display means electrically connected to the output of said display amplifiers.

13. An apparatus as defined in claim 12 in which the display amplifier comprises:

a filter;

an attenuator electrically connected to said filter;

an attenuator control for controlling the attenuator such that the attenuator follows a predetermined function;

a low-phase distortion filter connected to the output of said attenuator;

a second attenuator electrically connected to the output of said low-phase distortion filter;
an amplifier electrically connected to the output of said second attenuator;
a first kick gate having an input electrically connected to the input of said attenuator control;
an automatic volume control whose output is electrically connected to said second attenuator, such automatic volume control being electrically connected to the output of said amplifier such that said control is free to follow the output signal of said amplifier;
the output of said gate being electrically connected to the automatic volume control in a manner that a pulse from said gate initiates said control.

14. An apparatus as defined in claim 12 in which the amplifying means includes:
an input resistance;
an amplifier having a high gain whose gain is proportional to the ratio of the feedback resistance to the input resistance;
a summing junction between said input resistance and said amplifier, the feedback resistance of said amplifier including a plurality of parallel resistances; and
means to remove accumulatively one resistance at a time from the feedback resistance in which an additional resistance is removed each time the output of the amplifier reaches an average predetermined level.

References Cited by the Examiner
UNITED STATES PATENTS

| | | | |
|---|---|---|---|
| 2,286,106 | 6/1942 | Ritzmann | 340—15.5 |
| 2,939,107 | 5/1960 | Ball | 340—15.5 |
| 3,134,957 | 5/1964 | Foote et al. | 340—15.5 |
| 3,241,100 | 3/1966 | Loofbourrow | 340—15.5 |

BENJAMIN A. BORCHELT, *Primary Examiner.*

W. KUJAWA, *Assistant Examiner.*